W. A. GEIGER.
OPERATING MECHANISM FOR HAND BRAKES.
APPLICATION FILED FEB. 16, 1918.
1,300,375.
Patented Apr. 15, 1919.
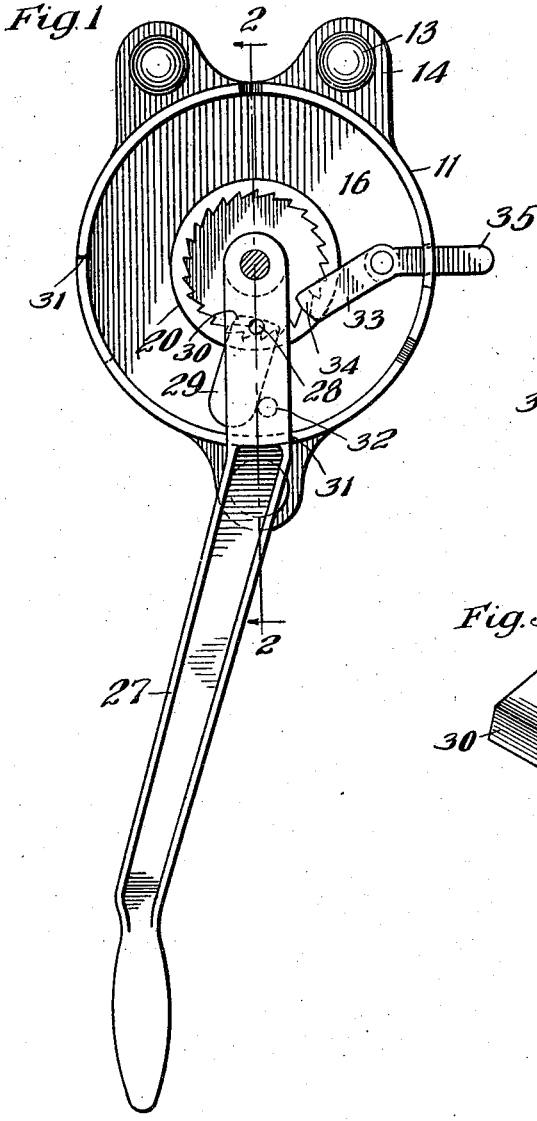
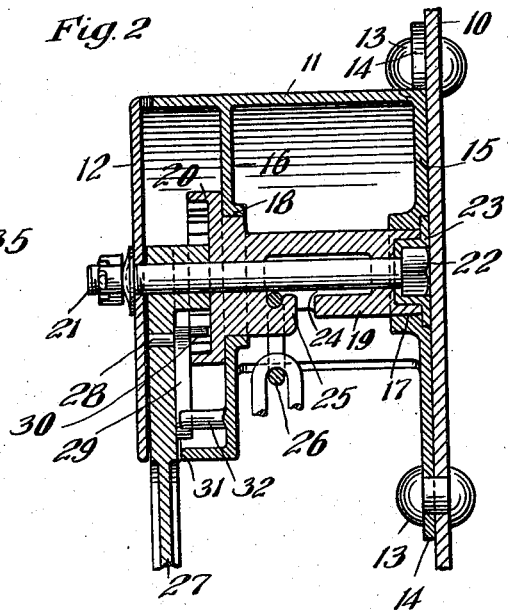
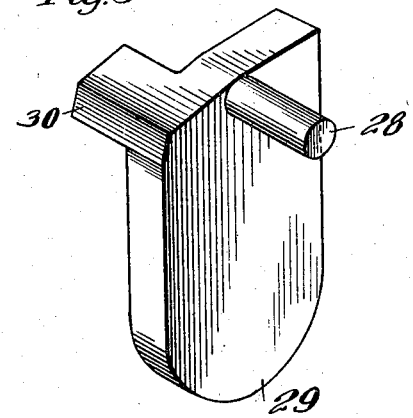
INVENTOR.
William A. Geiger
BY Geo. I. Haight
ATTORNEY

UNITED STATES PATENT OFFICE.

WILLIAM A. GEIGER, OF CHICAGO, ILLINOIS, ASSIGNOR TO WILLIAM H. MINER, OF CHAZY, NEW YORK.

OPERATING MECHANISM FOR HAND-BRAKES.

1,300,375.      Specification of Letters Patent.      Patented Apr. 15, 1919.

Application filed February 16, 1918. Serial No. 217,523.

*To all whom it may concern:*

Be it known that I, WILLIAM A. GEIGER, a citizen of the United States, residing at Chicago, in the county of Cook and State of Illinois, have invented a certain new and useful Improvement in Operating Mechanism for Hand-Brakes, of which the following is a full, clear, concise, and exact description, reference being had to the accompanying drawings, forming a part of this specification.

This invention relates to improvements in hand brakes.

The object of the invention is to provide a hand-operated brake suitable for railway cars, and more particularly freight cars, which brake is of simple and compact design, of relatively inexpensive construction and of easy operation.

In the drawing forming a part of this specification, Figure 1 is an end elevational view of a brake embodying my improvements, the cover-plate of the housing being removed. Fig. 2 is a vertical, sectional view, taken substantially on the line 2—2 of Fig. 1. And Fig. 3 is a detail, perspective view of the gravity-controlled pawl.

In said drawing, 10 denotes a wall of a freight car or other railroad car to which my improved brake is adapted to be attached. The brake, as shown, comprises a substantially cylindrical housing or casing 11 with a removable cover or cap-plate 12 within which the operating parts of the mechanism, hereinafter described, are mounted. The housing is adapted to be secured to the wall by any suitable means, such as the rivets 13, which pass through suitable ears 14 formed on the housing casing.

The housing or casing 11 has an integral inner end wall 15 and an intermediate wall or partition 16. The wall 15 is provided with a suitable bearing 17 and the partition 16 with a corresponding bearing 18 having a rotatable chain-winding spool or drum 19. The drum 19 at its outer end is provided with a preferably integral internal ratchet wheel 20, the latter fitting against the outer face of the intermediate partition 16. To retain the cap-plate 12 in position and also the other parts of the operating mechanism, a bolt 21 is employed having the nut at its outer end and the head 22 at its inner end seated in a suitable recessed block 23 designed to be positioned flush with the inner face of the wall 15, as clearly illustrated in Fig. 2. The drum 19 is suitably recessed to accommodate the bolt 21 and at its center is provided with an enlarged recess, as indicated at 24 and a hook 25 by which the top link 26 of the brake-tightening chain may be retained. As will be apparent from an inspection of Fig. 2, the link 26 is applied in position before the bolt 21 is inserted and after the latter is in position, said link 26 will be held against accidental removal.

In the outer chamber formed between the intermediate partition 16 and the cap-plate 12, is mounted an oscillating, gravity-controlled operating handle or lever 27, said handle being pivotally mounted on the bolt 21. Pivotally mounted on the handle 27 as by a pin 28 is a gravity-controlled pawl 29 having a laterally extended tooth 30 adapted to coöperate with the teeth of the ratchet 20. As appears from Figs. 1 and 2, the wall of the housing 11 is suitably recessed, as indicated at 31—31, to permit oscillatory movements of the handle 27, the normal position of the handle 27 being as indicated in Fig. 1, that is, hanging in a depending position under the influence of gravity. When in this position, the pawl 29 will occupy the position indicated in Fig. 1, that is, with the tooth 30 disengaged from the internal ratchet wheel 20 and this is accomplished by having the gravity-controlled pawl 29 engage against a stationary pin or lug 32 that is formed integrally on the outer face of the intermediate partition 16.

To hold the drum against reverse rotation when there is tension on the brake chain, I employ a gravity-controlled locking pawl 33 having a tooth 34 engaging the ratchet wheel 20. Said pawl 33 has an operating handle 35 extended outside of the casing by which the locking pawl may be disengaged, as will be understood.

To wind up the chain, the operator will swing the handle 27 to the left, as indicated in Fig. 1, and as this movement takes place, it is evident that the tooth of the pawl 29 will drop into engagement with the ratchet teeth after the pawl 29 has passed beyond the influence of the lug or pin 32. Continued oscillation of the handle 27 in the direction specified will of course rotate the chain-winding drum, after which the handle is swung back and the operation repeated. It is evident that upon releasing the handle 27, the latter will fall under the influence of gravity to the position shown in Fig. 1, and this will automatically disengage the pawl from the ratchet wheel. The chain can be released by disengaging the locking dog as will be apparent.

The device is simple, comprises few parts and affords an arrangement whereby the operator can wind the brake chain with one hand and without the necessity of operating any foot pawls and ratchets such as have heretofore been customary.

I claim:

1. In a winding mechanism of the character specified, the combination with a winding drum rotatable about a horizontal axis, of a ratchet wheel movable in unison with the drum, an operating handle oscillatably supported about the same axis as that of the drum, a gravity-controlled pawl pivotally carried by said handle intermediate its ends, said pawl being held out of engagement with the ratchet when the handle is in normal position.

2. In a winding mechanism of the character described, the combination with a rotatable winding drum, of a ratchet wheel movable in unison with said drum, an operating handle pivotally supported about an axis coinciding with that of the drum and adapted to return to its normal inoperative position under the influence of gravity, a pawl pivotally mounted on said handle and adapted to coöperate with said ratchet wheel, said pawl being independently gravity-controlled, and means for locking the drum against reverse rotation.

3. In a winding mechanism of the character described, the combination with a housing having a chain-winding drum rotatably mounted therein about a horizontal axis, of a ratchet wheel movable in unison with said drum, an operating handle pivotally mounted to oscillate about a horizontal axis and adapted to be returned to normal position under the influence of gravity, an independently gravity-controlled pawl pivotally mounted on said handle and adapted to coöperate with said ratchet wheel, and means for automatically disengaging said pawl from the ratchet wheel when said handle returns to its normal position.

4. In a hand brake for cars and the like, the combination with a housing within which is rotatably mounted a chain-winding drum about a horizontal axis, of an internal ratchet wheel rotatable in unison with said drum, an oscillatably mounted operating handle adapted to return to normal position under the influence of gravity, a pawl pivotally mounted on said handle and adapted to coöperate with said internal ratchet wheel, means for disengaging the pawl from said ratchet wheel when said handle returns to normal position, and means for locking said drum against reverse rotation.

In witness that I claim the foregoing I have hereunto subscribed my name this 29th day of Jan., 1918.

WILLIAM A. GEIGER.

Copies of this patent may be obtained for five cents each, by addressing the "Commissioner of Patents, Washington, D. C."